United States Patent
Aubee et al.

(10) Patent No.: US 9,850,369 B2
(45) Date of Patent: *Dec. 26, 2017

(54) BARRIER FILM FOR FOOD PACKAGING

(71) Applicant: NOVA Chemicals (International) S.A., Fribourg (CH)

(72) Inventors: Norman Dorien Joseph Aubee, Okotoks (CA); Douglas Checknita, Calgary (CA); P Scott Chisholm, Calgary (CA); Patrick Lam, Calgary (CA); Sarah Marshall, Calgary (CA); Denny Paul Sauvageau, Edmonton (CA); Tony Tikuisis, Calgary (CA); Tingting Yu Chuang, Edmonton (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,606

(22) Filed: Jan. 19, 2017

(65) Prior Publication Data

US 2017/0130040 A1    May 11, 2017

Related U.S. Application Data

(63) Continuation of application No. 15/248,315, filed on Aug. 26, 2016, which is a continuation of application No. 14/645,771, filed on Mar. 12, 2015, now abandoned, which is a continuation of application No. 13/856,627, filed on Apr. 4, 2013, now Pat. No. 9,587,093, which is a continuation of application No. 11/983,284, filed on Nov. 8, 2007, now abandoned.

(30) Foreign Application Priority Data

Nov. 17, 2006  (CA) .................................. 2568454

(51) Int. Cl.
| | |
|---|---|
| B29C 47/00 | (2006.01) |
| B29C 55/28 | (2006.01) |
| B29C 47/88 | (2006.01) |
| B29K 23/00 | (2006.01) |
| B29K 105/00 | (2006.01) |
| B29L 7/00 | (2006.01) |
| B32B 27/32 | (2006.01) |
| C08J 5/18 | (2006.01) |
| C08K 5/00 | (2006.01) |
| C08L 23/06 | (2006.01) |
| B32B 27/08 | (2006.01) |

(52) U.S. Cl.
CPC .......... *C08L 23/06* (2013.01); *B29C 47/0004* (2013.01); *B29C 47/0021* (2013.01); *B29C 47/0026* (2013.01); *B29C 47/8835* (2013.01); *B29C 55/28* (2013.01); *B32B 27/08* (2013.01); *B32B 27/32* (2013.01); *C08J 5/18* (2013.01); *B29C 47/00* (2013.01); *B29K 2023/065* (2013.01); *B29K 2023/083* (2013.01); *B29K 2023/086* (2013.01); *B29K 2105/0005* (2013.01); *B29K 2105/0094* (2013.01); *B29K 2995/0063* (2013.01); *B29K 2995/0067* (2013.01); *B29K 2995/0069* (2013.01); *B29L 2007/008* (2013.01); *B32B 2250/242* (2013.01); *B32B 2270/00* (2013.01); *B32B 2307/72* (2013.01); *B32B 2307/7246* (2013.01); *B32B 2439/70* (2013.01); *C08J 2323/06* (2013.01); *C08J 2423/06* (2013.01); *C08K 5/0083* (2013.01); *C08L 2201/14* (2013.01); *C08L 2203/16* (2013.01); *C08L 2203/162* (2013.01); *C08L 2205/02* (2013.01); *C08L 2205/025* (2013.01); *C08L 2205/24* (2013.01); *C08L 2207/062* (2013.01); *Y10T 428/27* (2015.01)

(58) Field of Classification Search
CPC .. C08L 23/06; C08L 2205/02; C08L 2201/14; C08L 2203/162; C08L 2205/025; C08L 2207/062; C08K 5/0083; B29C 47/021; B29C 47/00; B29C 55/28; B32B 27/32; B29K 2023/065; B29K 2023/083; B29K 2023/086; B29K 2105/005; B29K 2995/0067; B29K 2995/0069; B29L 2007/008

See application file for complete search history.

(56) References Cited

PUBLICATIONS

ASTM D1238-10; Standard Test Method for Melt Flow Rates of Thermoplastics by Extrusion Plastometer; Copyright ASTM International; Current edition approved Feb. 1, 2010. Published Mar. 2010. Originally approved in 1965. Last previous edition approved in 2004 as D1238-04c. pp. 1-15.

ASTM F 1249-90 (Reapproved 1995); Standard Test Method for Water Vapor Transmission Rate Through Plastic Film and Sheeting Using a Modulated Infrared Sensor; Copyright ASTM International; Current edition approved Jul. 27, 1990. Published Sep. 1990. Originally published as F1249-89. Last previous edition F 1249-89. pp. 1-5.

*Primary Examiner* — Kevin R Kruer
(74) *Attorney, Agent, or Firm* — Lawrence T. Kale

(57) ABSTRACT

Barrier films are prepared from a blend of two high density polyethylene blend components and a high performance organic nucleating agent. The two high density polyethylene blend components have substantially different melt indices. Large reductions in the moisture vapor transmission rate of the film are observed in the presence of the nucleating agent when the melt indices of the two blend components have a ratio of greater than 10/1. The resulting barrier films are suitable for the preparation of packaging for dry foods such as crackers and breakfast cereals.

7 Claims, No Drawings

BARRIER FILM FOR FOOD PACKAGING

REFERENCE TO RELATED APPLICATIONS

This Application is a continuation of U.S. patent application Ser. No. 15/248,315 filed on Aug. 26, 2016 which is a continuation of U.S. patent application Ser. No. 14/645,771 filed on Mar. 12, 2015 (Abandoned) which is a continuation of U.S. patent application Ser. No. 13/856,627 filed on Apr. 4, 2013 which is a continuation of U.S. patent application Ser. No. 11/983,284 filed on Nov. 8, 2007 (Abandoned), entitled "Barrier Film For Food Packaging, which are herein incorporated by reference in their entirety.

FIELD OF THE INVENTION

This invention relates to barrier films which are prepared from a blend of at least two high density polyethylene (hdpe) resins and a nucleating agent. The films are used to prepare packaging for dry foods such as crackers and breakfast cereals.

BACKGROUND OF THE INVENTION

Polyethylene may be classified into two broad families, namely "random" (which is commercially prepared by initiation with free radicals under polymerization conditions that are characterized by the use of very high ethylene pressures) and "linear" (which is commercially prepared with a transition metal catalyst, such as a "Ziegler Natta" catalyst, or a "chromium" catalyst, or a single site catalyst or a "metallocene catalyst").

Most "random" polyethylene which is commercially sold is a homopolymer polyethylene. This type of polyethylene is also known as "high pressure low density polyethylene" because the random polymer structure produces a lower polymer density. In contrast, most "linear" polyethylene which is commercially sold is copolymer of ethylene with at least one alpha olefin (especially butene, hexene or octene). The incorporation of a comonomer into linear polyethylene reduces the density of the resulting copolymer. For example, a linear ethylene homopolymer generally has a very high density (typically greater than 0.955 grams per cubic centimeter (g/cc))—but the incorporation of small amounts of comonomer results in the production of so-called "high density polyethylene" (or "hdpe"—typically, having densities greater than 0.935 g/cc) and the incorporation of further comonomer produces so-called "linear low density polyethylene" (or "lldpe"—typically having a density of from about 0.905 g/cc to 0.935 g/cc).

Some plastic film is made from hdpe. One particular type of hdpe film is used to prepare food packaging with "barrier properties"—i.e. the film acts as a "barrier" to water vapor transmission. This so-called "barrier film" is used to prepare packages (or liners for cardboard packages) for breakfast cereals, crackers and other dry foodstuffs.

It has recently been discovered that the barrier properties of hdpe film may be improved by the addition of a nucleating agent.

We have now discovered that further improvements in barrier properties may be achieved by the use of a blend of two hdpe resins which have substantially a different melt index from each other.

SUMMARY OF THE INVENTION

The present invention provides:
I) an organic barrier nucleating agent; and
II) a high density polyethylene blend composition comprising:
  II-i) from 5 to 60 weight % of at least one high density polyethylene blend component a) having a high melt index, $I_2$; and
  II-ii) from 95 to 40 weight % of at least one high density polyethylene blend component b) having a low melt index, $I_2'$, wherein:
    w) said organic barrier nucleating agent is added in an amount of from 100 to 3000 parts per million based on the weight of said high density blend composition;
    x) each of said blend component a) and blend component b) has a density of from 0.950 to 0.975 g/cc;
    y) the melt index, $I_2$, of said blend composition is from 0.5 to 10 grams/10 minutes; and
    z) the $I_2$ ratio, obtained by dividing the $I_2$ value of said blend component a) by the $I_2'$ value of said blend component b) is greater than 10/1.

DETAILED DESCRIPTION OF PREFERRED EMBODIMENTS

Barrier Film and Food Packaging

Plastic films are widely used as packaging materials for foods. Flexible films, including multilayer films, are used to prepare bags, wrappers, pouches and other thermoformed materials.

The permeability of these plastic films to gases (especially oxygen) and moisture is an important consideration during the design of a suitable food package.

Films prepared from thermoplastic ethylene-vinyl alcohol ("EVOH") copolymers are commonly employed as an oxygen barrier and/or for resistance to oils. However, EVOH films are quite permeable to moisture.

Conversely, polyolefins, especially high density polyethylene, are resistant to moisture transmission but comparatively permeable to oxygen.

The permeability of linear polyethylene film to moisture is typically described by a "water vapor transmission rate" (or "WVTR"). In certain applications some vapor transmission is desirable—for example, to allow moisture out of a package which contains produce. The use of linear low density polyethylene (lldpe) which may be filled with calcium carbonate (to further increase vapor transmission) is common for this purpose.

Conversely, for packages which contain crispy foods such as breakfast cereals or crackers, it is desirable to limit WVTR to very low levels to prevent the food from going stale. The use of hdpe to prepare "barrier film" is common for this purpose. A review of plastic films and WVTR behavior is provided in U.S. Pat. No. 6,777,520 (McLeod et al.)

This invention relates to "barrier films" prepared from hdpe—i.e. films with low MVTR. As will be appreciated from the above description of EVOH films, it is also known to prepare multilayer barrier films to produce a structure which is resistant to moisture and oxygen. Multilayer structures may also contain additional layers to enhance packaging quality—for example, additional layers may be included to provide impact resistance or tear strength. It will also be appreciated by those skilled in the art that "tie layers" may be used to improve the adhesion between "structural"

layers. In such multilayer structures, the hdpe barrier layer may either be used as an internal ("core") layer or external ("skin") layer.

The manufacture of "barrier" food packaging from plastic resins involves two basic operations.

The first operation involves the manufacture of plastic film from the plastic resin. Most "barrier films" are prepared by "blown film" extrusion, in which the plastic is melted in an extruder, then forced through an annular die. The extrudate from the annular die is subjected to blown air, thus forming a plastic bubble. The use of multiple extruders and concentric dies permits multilayer structures to be co-extruded by the blown film process. The "product" from this operation is "barrier film" which is collected on rolls and shipped to the manufacturers of food packaging.

The manufacturer of the food packaging generally converts the rolls of blown film into packaged foods. This typically involves three basic steps:

1) forming the package;
2) filling the package;
3) sealing the food in the finished package.

Although the specific details will vary from manufacturer to manufacturer, it will be readily appreciated that the film needs to have a balance of physical properties in order to be suitable for food packaging. In addition to low MVTR, it is desirable for the film to "seal" well and to have sufficient impact strength and stiffness (or film "modulus") to allow easy handling of the package. Multilayer coextrusions are often used to achieve this balance of properties, with 3 and 5 layer coextrusions being well known. Sealant layers may be prepared with ethylene-vinyl acetate (EVA) ionomers (such as those sold under the trademark SURLYN™ by E.I. DuPont), very low density polyethylene (polyethylene copolymers having a density of less than 0.910 grams per cubic centimeter) and blends with small amounts of polybutene. It is known to use sealant compositions in both "skin" layers of a coextrusion or in only one of the skin layers.

HDPE Blend Components and Overall Composition

The plastic used in the barrier film of this invention is high density polyethylene (hdpe). Specifically, the hdpe must have a density of at least 0.950 grams per cubic centimeter ("g/cc") as determined by ASTM D 1505. Preferred hdpe has a density of greater than 0.955 g/cc and the most preferred hdpe is a homopolymer of ethylene.

Blend Components

Blend Component a)

Blend component a) of the polyethylene composition used in this invention comprises an hdpe with a comparatively high melt index. As used herein, the term "melt index" is meant to refer to the value obtained by ASTM D 1238 (when conducted at 190° C., using a 2.16 kg weight). This term is also referenced to herein as "$I_2$" (expressed in grams of polyethylene which flow during the 10 minute testing period, or "gram/10 minutes"). As will be recognized by those skilled in the art, melt index, $I_2$, is in general inversely proportional to molecular weight. Thus, blend component a) of this invention has a comparatively high melt index (or, alternatively stated, a comparatively low molecular weight) in comparison to blend component b).

The absolute value of $I_2$ for blend component a) is preferably greater than 5 grams/10 minutes. However, the "relative value" of $I_2$ for blend component a) is critical—it must be at least 10 times higher than the $I_2$ value for blend component b) [which $I_2$ value for blend component b) is referred to herein as $I_2'$]. Thus, for the purpose of illustration: if the $I_2'$ value of blend component b) is 1 gram/10 minutes, then the $I_2$ value of blend component a) must be at least 10 grams/10 minutes.

Blend component a) is further characterized by:

i) density—it must have a density of from 0.950 to 0.975 g/cc; and ii) weight % of the overall polyethylene composition—it must be present in an amount of from 5 to 60 weight % of the total hdpe composition (with blend component b) forming the balance of the total polyethylene) with amounts of from 10 to 40 weight %, especially from 20 to 40 weight %, being preferred. It is permissible to use more than one high density polyethylene to form blend component a).

The molecular weight distribution [which is determined by dividing the weight average molecular weight (Mw) by number average molecular weight (Mn) where Mw and Mn are determined by gel permeation chromatography, according to ASTM D 6474-99] of component a) is preferably from 2 to 20, especially from 2 to 4. While not wishing to be bound by theory, it is believed that a low Mw/Mn value (from 2 to 4) for component a) may improve the nucleation rate and overall barrier performance of blown films prepared according to the process of this invention.

Blend Component b)

Blend component b) is also a high density polyethylene which has a density of from 0.950 to 0.970 g/cc (preferably from 0.955 to 0.965 g/cc).

The melt index of blend component b) is also determined by ASTM D 1238 at 190° C. using a 2.16 kg load. The melt index value for blend component b) (referred to herein as $I_2'$) is lower than that of blend component a), indicating that blend component b) has a comparatively higher molecular weight. The absolute value of $I_2'$ is preferably from 0.1 to 2 grams/10 minutes.

The molecular weight distribution (Mw/Mn) of component b) is not critical to the success of this invention, though a Mw/Mn of from 2 to 4 is preferred for component b).

As noted above, the ratio of the melt index of component b) divided by the melt index of component a) must be greater than 10/1.

Blend component b) may also contain more than one hdpe resin.

Overall HDPE Composition

The overall high density blend composition used in this invention is formed by blending together blend component a) with blend component b). This overall hdpe composition must have a melt index (ASTM D 1238, measured at 190° C. with a 2.16 kg load) of from 0.5 to 10 grams/10 minutes (preferably from 0.8 to 8 grams/10 minutes).

The blends may be made by any blending process, such as: 1) physical blending of particulate resin; 2) co-feed of different hdpe resins to a common extruder; 3) melt mixing (in any conventional polymer mixing apparatus); 4) solution blending; or, 5) a polymerization process which employs 2 or more reactors.

One preferred hdpe blend composition is prepared by melt blending the following two blend components in an extruder:

from 10 to 30 weight % of component a): where component a) is a conventional hdpe resin having a melt index, $I_2$, of from 15-30 grams/10 minutes and a density of from 0.950 to 0.960 g/cc with from 90 to 70 weight % of component b): where component b) is a conventional hdpe resin having a melt index, $I_2$, of from 0.8 to 2 grams/10 minutes and a density of from 0.955 to 0.965 g/cc.

An example of a commercially available hdpe resin which is suitable for component a) is sold under the trademark SCLAIR™ 79F, which is an hdpe resin that is prepared by the homopolymerization of ethylene with a conventional Ziegler Natta catalyst. It has a typical melt index of 18 grams/10 minutes and a typical density of 0.963 g/cc and a typical molecular weight distribution of about 2.7.

Examples of commercially available hdpe resins which are suitable for blend component b) include (with typical melt index and density values shown in brackets):

SCLAIR™ 19G (melt index=1.2 grams/10 minutes, density=0.962 g/cc);

MARFLEX™ 9659 (available from Chevron Phillips, melt index=1 grams/10 minutes, density=0.962 g/cc); and ALATHON™ L 5885 (available from Equistar, melt index=0.9 grams/10 minutes, density=0.958 g/cc).

A highly preferred hdpe blend composition is prepared by a solution polymerization process using two reactors that operate under different polymerization conditions. This provides a uniform, in situ blend of the hdpe blend components. An example of this process is described in published U.S. patent application 20060047078 (Swabey et al.), the disclosure of which is incorporated herein by reference. The overall hdpe blend composition preferably has a MWD (Mw/Mn) of from 3 to 20.

Nucleating Agents

The term "nucleating agent", as used herein, is meant to convey its conventional meaning to those skilled in the art of preparing nucleated polyolefin compositions, namely an additive that changes the crystallization behavior of a polymer as the polymer melt is cooled.

Nucleating agents are widely used to prepare classified polypropylene and to improve the molding characteristics of polyethylene terphlate (PET).

A review of nucleating agents is provided in U.S. Pat. Nos. 5,981,636; 6,466,551 and 6,559,971, the disclosures of which are incorporated herein by reference.

There are two major families of nucleating agents, namely "inorganic" (e.g. small particulates, especially talc or calcium carbonate) and "organic".

Examples of conventional organic nucleating agents which are commercially available and in widespread use as polypropylene additives are the dibenzylidene sorbital esters (such as the products sold under the trademark Millad™ 3988 by Milliken Chemical and Irgaclear™ by Ciba Specialty Chemicals). The present invention does not utilize either of the above described "inorganic" or conventional organic nucleating agents because they do not always improve the barrier performance of films prepared from hdpe resins (as shown in the Examples). The nucleating agents which are used in the present invention are generally referred to as "high performance nucleating agents" in literature relating to polypropylene. These nucleating agents are referred to herein as "organic barrier nucleating agents"—which, (as used herein), is meant to describe an organic nucleating agent which improves (reduces) the moisture vapor transmission rate (MVTR) of a film prepared from hdpe. This may be readily determined by: 1) preparing an hdpe film having a thickness of 1.5-2 mils in a conventional blown film process (as described in the Examples below) in the absence of a nucleator; 2) preparing a second film of the same thickness (with 1000 parts per million by weight of the organic nucleator being well dispersed in the hdpe) under the same conditions used to prepare the first film. If the MVTR of the second film is lower than that of the first (preferably, at least 5-10% lower), then the nucleator is suitable for use in the present invention.

High performance, organic nucleating agents which have a very high melting point have recently been developed. These nucleating agents are sometimes referred to as "insoluble organic" nucleating agents—to generally indicate that they do not melt disperse in polyethylene during polyolefin extrusion operations. In general, these insoluble organic nucleating agents either do not have a true melting point (i.e. they decompose prior to melting) or have a melting point greater than 300° C. or, alternatively stated, a melting/decomposition temperature of greater than 300° C.

The organic nucleating agents are preferably well dispersed in the hdpe polyethylene composition of this invention. The amount of nucleating agent used is comparatively small—from 100 to 3000 parts by million per weight (based on the weight of the polyethylene) so it will be appreciated by those skilled in the art that some care must be taken to ensure that the nucleating agent is well dispersed. It is preferred to add the nucleating agent in finely divided form (less than 50 microns, especially less than 10 microns) to the polyethylene to facilitate mixing. This type of "physical blend" (i.e. a mixture of the nucleating agent and the resin in solid form) is generally preferable to the use of a "masterbatch" of the nucleator (where the term "masterbatch" refers to the practice of first melt mixing the additive—the nucleator, in this case—with a small amount of hdpe resin—then melt mixing the "masterbatch" with the remaining bulk of the hdpe resin).

Examples of high performance organic nucleating agents which may be suitable for use in the present invention include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophtalic acid structure (or "HHPA" structure) as disclosed in U.S. Pat. No. 6,559,971 (Dotson et al., to Milliken); and phosphate esters, such as those disclosed in U.S. Pat. No. 5,342,868 and those sold under the trade names NA-11 and NA-21 by Asahi Denka Kogyo. Preferred nucleators are cylic dicarboxylates and the salts thereof, especially the divalent metal or metalloid salts, (particularly, calcium salts) of the HHPA structures disclosed in U.S. Pat. No. 6,559,971. For clarity, the HHPA structure generally comprises a ring structure with six carbon atoms in the ring and two carboxylic acid groups which are substituents on adjacent atoms of the ring structure. The other four carbon atoms in the ring may be substituted, as disclosed in U.S. Pat. No. 6,559,971. A preferred example is 1,2-cyclohexanedicarboxylic acid, calcium salt (CAS registry number 491589-22-1).

Other Additives

The hdpe may also contain other conventional additives, especially (1) primary antioxidants (such as hindered phenols, including vitamin E); (2) secondary antioxidants (especially phosphites and phosphonites); and (3) process aids (especially fluoroelastomer and/or polyethylene glycol bound process aid).

Film Extrusion Process

Blown Film Process

The extrusion-blown film process is a well known process for the preparation of plastic film. The process employs an extruder which heats, melts and conveys the molten plastic and forces it through an annular die. Typical extrusion temperatures are from 330 to 500° F., especially 350 to 460° F.

The polyethylene film is drawn from the die and formed into a tube shape and eventually passed through a pair of draw or nip rollers. Internal compressed air is then introduced from the mandrel causing the tube to increase in diameter forming a "bubble" of the desired size. Thus, the blown film is stretched in two directions, namely in the axial direction (by the use of forced air which "blows out" the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed into two doubled layers of film immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of the polyethylene and by the processing conditions. For example, the processing conditions are thought to influence the degree of molecular orientation (in both the machine direction and the axial or cross direction).

A balance of "machine direction" ("MD") and "transverse direction" ("TD"—which is perpendicular to MD) molecular orientation is generally considered most desirable for key properties associated with the invention (for example, Dart Impact strength, Machine Direction and Transverse Direction tear properties).

Thus, it is recognized that these stretching forces on the "bubble" can affect the physical properties of the finished film. In particular, it is known that the "blow up ratio" (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a "co-extrusion" process that allows more than one stream of molten polymer to be introduced to an annular die resulting in a multi-layered film membrane or 2) a lamination process in which film layers are laminated together. The films of this invention are preferably prepared using the above described blown film process.

An alternative process is the so-called cast film process, wherein the polyethylene is melted in an extruder, then forced through a linear slit die, thereby "casting" a thin flat film. The extrusion temperature for cast film is typically somewhat hotter than that used in the blown film process (with typically operating temperatures of from 450 to 550° F.). In general, cast film is cooled (quenched) more rapidly than blown film.

Further details are provided in the following examples.

EXAMPLES

Example 1

Screening tests for the efficiency of a high efficiency organic nucleating agent in different hdpe barrier film compositions were conducted on a blown film line manufactured by Battenfeld Gloucester Engineering Company of Gloucester, Mass. This blown film line has a standard output of more than 100 pounds per hour and is equipped with a 50 horsepower motor. The extender screw has a 2.5 mil diameter and a length/diameter (L/D) ratio of 24/1.

The blown film bubble is air cooled. Typical blow up ratio (BUR) for barrier films prepared on this line are from 1.5/1 to 4/1. An annular die having a gap of 85 mils was used for these experiments.

The films of this example were prepared using a BUR aiming point of 2/1 and a film thickness aiming point of 1.5 mils.

The "high efficiency" nucleating agent used in this example was a salt of a cyclic dicarboxylic acid, namely the calcium salt of 1,2 cyclohexanedicarboxylic acid (CAS Registry number 491589-22-1, referred to in these examples as "nucleating agent 1").

Water Vapor Transmission Rate ("WVTR", expressed as grams of water vapor transmitted per 100 square inches of film per day at a specified film thickness (mils), or g/100 in$^2$/day) was measured in accordance with ASTM F1249-90 with a MOCON permatron developed by Modern Controls Inc. at conditions of 100° F. (37.8° C.) and 100% relative humidity. A control (comparative) experiment was conducted using a single low melt index hdpe resin having a melt index of about 1.2 grams/10 minutes, a density of 0.962 g/cc and a molecular weight distribution, Mw/Mn, of 4.9 (an ethylene homopolymer, sold under the trademark SCLAIR™ 19G ("19G resin") by NOVA Chemicals Inc. ("NCI") of Pittsburgh, Pa.).

Table 1 illustrates that a film prepared from the 19G resin in the absence of the nucleator had an MVTR value of 0.2084 g/100 in$^2$/day (film 1) and that the nucleating agent improved the MVTR to 0.1906 g/100 in$^2$/day (film 2). This illustrates that nucleating agent 1 is an "organic barrier nucleating agent" that may be used to improve the MVTR performance of barrier film.

Films 3-6 were prepared by blending 85 weight % of the 19G with 15% of resins having a high melt index, in the presence and absence of the nucleating agent 1.

Comparative films 3 and 4 were prepared using a hdpe homopolymer resin sold under the trademark SCLAIR™ 2907 as a (comparative) component b). This resin has a melt index of only 4.9 grams/10 minutes (and, accordingly, the melt index ratio of the two hdpe resins is only 4.2/1.2, or less than 4/1). The density of 2907 resin is typically 0.960 g/cc. As shown in Table 1, a film prepared with this blend in the absence of a nucleating agent had an MVTR of 0.1851 g/100 in$^2$/day (comparative film 3) and the nucleating agent improved this value to 0.1720 g/100 in$^2$/day—an improvement of only 0.0131 g/100 in$^2$/day.

Inventive film 6 and comparative film 5 were prepared using an hdpe composition prepared by melt blending 85 weight % of the 19G resin with 15 weight % of an hdpe homopolymer resin sold under the trademark SCLAIR™ 79F by NCI as component b). This 79F resin had a melt index of 18 grams/10 minutes, a density of 0.963 g/cc and a molecular weight distribution of 2.7. The overall melt index ($I_2$) of the blend was estimated to be 1.8 grams/10 minutes.

As shown in Table 1, comparative film 5 (prepared from the 85/15 blend of the 19G and 79F hdpe resins, in the absence of nucleating agent 1) had an MVTR value of 0.1955 g/100 in$^2$/day.

Inventive film 6, prepared from the hdpe composition of film 5 plus 1000 ppm of the nucleating agent, had an MVTR value of 0.1525 g/100 in$^2$/day (which represents an improvement of more than 20% over the MVTR value of film 5).

Table 1 also illustrates data which describe the properties of barrier film prepared from an experimental hdpe homopolymer resin. This experimental resin was prepared in a dual reactor solution polymerization process in accordance with the disclosure of published U.S. patent application 20060047078 (Swabey et al.). The experimental resin (EXP in Table 1) had a melt index, $I_2$, of 1.2 grams/10 minutes, a density of 0.967 g/cc and a molecular weight distribution, Mw/Mn, of 8.9. The EXP resin had two distinct fractions which varied according to molecular weight. The low molecular weight fraction (or component a)) was about 55 weight % of the total composition and had a melt index, $I_2$, which was estimated to be greater than 5000 grams/10 minutes. The high molecular weight fraction was about 45 weight % of the total composition and had a melt index which was estimated to be less than 0.1 grams/10 minutes.

As noted above, melt index ($I_2$) is generally inversely proportional to molecular weight for polyethylene resins. This was confirmed for homopolymer hdpe resins having a narrow molecular weight distribution (of less than 3) by preparing a plot of log ($I_2$) versus log (weight average molecular weight, Mw). In order to prepare this plot, the melt index ($I_2$) and weight average molecular Mw) of more than 15 different homopolymer hdpe resins was measured. These homopolymer hdpe resins had a narrow molecular weight distribution (less than 3) but had different Mw—ranging from about 30,000 to 150,000. (As will be appreciated by those skilled in the art, it is difficult to obtain reproducible $I_2$ values for polyethylene resins having a molecular weight which is outside of this range).

A log/log plot of these $I_2$ and Mw values was used to calculate the following relation between $I_2$ and Mw for such homopolymer hdpe resins:

$$I_2 = (1.774 \times 10^{+19}) \times (Mw^{-3.86}).$$

Extrapolation (based on the above relation) was used to estimate the $I_2$ values of component a) and component b) of the EXP resin. That is, the molecular weight of component a) and component b) was measured and the Mw values were used to estimate the $I_2$ values. It will be appreciated by those skilled in the art that it can be difficult to physically blend these hdpe blend components (due to the very different viscosities of these hdpe blend components). Accordingly, solution blending or an in-situ blending (i.e. prepared by a polymerization process) are preferred methods to prepare such hdpe compositions. As shown in Table 1, (comparative) film 7, prepared from this EXP resin had an MVTR of 0.1594 grams/10 minutes. Inventive film 8 was made with an hdpe composition prepared by adding 1000 ppm of the nucleating agent to the EXP resin.

Example 2—Comparative

Barrier films were prepared with the inventive hdpe blend compositions used in experiment 6 of Example 1 (i.e. 85/15 of the aforedescribed 19G and 79F resins) with other nucleating agents.

The films were prepared on a smaller film line manufactured by Macro Engineering and Technology of Mississauga, Ontario, Canada. The line was operated with an annular die having a die gap of 100 mls; a BUR aiming point of 2:1 and a film thickness aiming point of 1.5 mils.

The data in Table 2 illustrate that neither talc nor DBS are suitable for use in this invention.

TABLE 1

| | HDPE Composition | | | |
|---|---|---|---|---|
| Film | Component a) (wt %) | Component b) (wt %) | Nucleating Agent 1 (ppm) | WVTR (g/100 in²/day) |
| 1-c | — | "19G (100%)" | — | 0.2084 |
| 2-c | — | "19G (100%)" | 1000 | 0.1906 |
| 3-c | 2907 (15%) | "19G (85%)" | — | 0.1851 |
| 4-c | 2907 (15%) | "19G (85%)" | 1000 | 0.1720 |
| 5-c | 79F (15%) | "19G (85%)" | — | 0.1955 |
| 6 | 79F (15%) | "19G (85%)" | 1000 | 0.1525 |
| 7-c | "EXP" | | — | 0.1594 |
| 8 | "EXP" | | 1000 | 0.0749 |

Notes:
"19G" = SCLAIR ™ 19G ($I_2$ = 1.2 grams/10 minutes, density = 0.962 g/cc)
"2907" = SCLAIR ™ 2907 ($I_2$ = 4.9 grams/10 minutes, density = 0.960 g/cc)
"79F" = SCLAIR ™ 79F ($I_2$ = 18 grams/10 minutes, density = 0.963 g/cc)
EXP = experimental resin (described above) ($I_2$ = 1.2 grams/10 minutes, density = 0.967 g/cc)

TABLE 2

| Film | Nucleating Agent (ppm) | WVTR (g/100 in²/day) |
|---|---|---|
| 10 | None | 0.2445 |
| 11 | Talc (2500 (ppm) | 0.2503 |
| 12 | DBS (ppm) | 0.3836 |
| 13 | Organic Nucleating Agent (1000 ppm) | 0.1574 |

Notes:
Organic nucleating agent 1 was the same as used in inventive films 2, 4, 6 and 8 of example 1.

The hdpe composition used in all experiments was that of experiment 6 of example 1 (i.e. 85 weight % SCLAIR™ 19G resin and 15 weight %

SCLAIR™ 79F resin). The "DBS" nucleating agent is a dibenzylidene sorbital ester sold under the trademark Irgaclear™ by Ciba. The talc was sold under the trademark Cimpact™ 699 and was reported to have an average particle size of 1.5 microns and an aspect ratio of 5:1.

What is claimed is:

1. A polyethylene film comprising at least one layer, wherein said layer is prepared from a mixture comprising;
  a) from about 5 to about 60 weight percent, based on the total weight of said mixture, of a component a) comprising at least one high density polyethylene having a density of from 0.950 to 0.975 g/cc and a high melt index $I_2$;
  b) from about 95 to about 40 weight percent, based on the total weight of said mixture, of a component b) comprising at least one high density polyethylene having a density from about 0.950 to about 0.970 g/cc and a low melt index $I_2'$, and;
  c) from about 100 to about 3,000 ppm of a calcium salt of 1,2-cyclohexanedicarboxylic acid;
wherein, a melt index ratio, defined by dividing said high melt index $I_2$ of said component a) by said low melt index $I_2'$ of said component b), is greater than 10/1;
wherein the water vapor transmission rate of said polyethylene film is improved, by being from about 20% to about 53% lower, relative to a control polyethylene film of the same composition but not containing said calcium salt of 1,2-cyclohexanedicarboxylic acid;
wherein density is measured according to ASTM D 1505, and;
wherein melt index is measured according to ASTM D 1238 when conducted at 190° C. using a 2.16 kg weight.

2. The polyethylene film according to claim 1, wherein said mixture has a density from about 0.955 to about 0.967 g/cc.

3. The polyethylene film according to claim 1, wherein said mixture has a melt index, $I_2$, from about 0.8 to about 8 grams/10 minutes.

4. The polyethylene film according to claim 1, wherein said film is a multilayer film comprising at least one layer comprising said mixture.

5. A method for improving the barrier properties of a polyethylene film, said method comprising the steps of converting into a film a mixture comprising:
   a) from about 5 to about 60 weight percent, based on the total weight of said mixture, of a component a) comprising at least one high density polyethylene having a density of from about 0.950 to about 0.975 g/cc and a high melt index $I_2$;
   b) from about 95 to about 40 weight percent, based on the total weight of said mixture, of a component b) comprising at least one high density polyethylene having a density of from about 0.950 to about 0.970 g/cc and a low melt index $I_2'$, and;
   c) from about 100 to about 3,000 ppm of a calcium salt of 1,2-cyclohexanedicarboxylic acid;

wherein, a melt index ratio, defined by dividing said high melt index $I_2$ of said component a) by said low melt index $I_2'$ of said component b), is greater than 10/1;

wherein the water vapor transmission rate of said polyethylene film is improved, by being from about 20% to about 53% lower, relative to a control polyethylene film of the same composition but not containing said calcium salt of 1,2-cyclohexanedicarboxylic acid;

wherein density is measured according to ASTM D 1505, and;

wherein melt index is measured according to ASTM D 1238 when conducted at 190° C. using a 2.16 kg weight.

6. The method of claim 5, wherein said mixture has a density from about 0.955 to about 0.967 g/cc.

7. The method of claim 5, wherein said mixture has a melt index, $I_2$, from about 0.8 to about 8 grams/10 minutes.

* * * * *